US009667837B2

(12) United States Patent
Matsuzaki

(10) Patent No.: US 9,667,837 B2
(45) Date of Patent: May 30, 2017

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Masanori Matsuzaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/571,189

(22) Filed: Dec. 15, 2014

(65) Prior Publication Data
US 2015/0172511 A1 Jun. 18, 2015

(30) Foreign Application Priority Data
Dec. 18, 2013 (JP) ................................. 2013-261493

(51) Int. Cl.
*H04N 1/00* (2006.01)
*H04N 1/60* (2006.01)
*G06T 7/90* (2017.01)

(52) U.S. Cl.
CPC ............. *H04N 1/6025* (2013.01); *G06T 7/90* (2017.01); *H04N 1/00005* (2013.01); *H04N 1/00023* (2013.01); *H04N 1/00058* (2013.01); *H04N 1/6033* (2013.01); *H04N 1/6058* (2013.01); *H04N 1/6075* (2013.01); *H04N 2201/0094* (2013.01)

(58) Field of Classification Search
CPC ... H04N 1/6025; H04N 1/6033; H04N 1/6058
See application file for complete search history.

(56) References Cited

U.S. PATENT DOCUMENTS

| 5,243,414 | A | 9/1993 | Dalrymple | |
|---|---|---|---|---|
| 6,459,449 | B1* | 10/2002 | Juen | H04N 9/735 348/223.1 |
| 9,025,223 | B2* | 5/2015 | Murakami | H04N 1/6058 345/601 |

(Continued)

FOREIGN PATENT DOCUMENTS

| JP | 2011-254350 A | 12/2011 |
|---|---|---|
| JP | 2013-021679 A | 1/2013 |

*Primary Examiner* — John Wallace
*Assistant Examiner* — Darryl V Dottin
(74) *Attorney, Agent, or Firm* — Canon U.S.A., Inc. IP Division

(57) ABSTRACT

An image processing apparatus according to the present invention includes a unit configured to convert colorimetric values resulting from colorimetry performed, in a first color space, on a chart output by using multi color chart data represented in a three-dimensional color space, into colors of a uniform color space, a unit configured to acquire a first color conversion table for converting a three-dimensional color space into a uniform color space, a unit configured to correct a second color conversion table for converting a uniform color space into a three-dimensional color space by using colorimetric values of the uniform color space, target values of the uniform color space, and the second color conversion table, and a unit configured to generate a color conversion table for correcting a four-dimensional color space by using the first color conversion table and the corrected second color conversion table.

11 Claims, 15 Drawing Sheets

(56) References Cited

U.S. PATENT DOCUMENTS

2007/0188782 A1  8/2007 Sakurai
2011/0299102 A1* 12/2011 Matsuzaki ......... H04N 1/00015
                                                358/1.9
2012/0321177 A1  12/2012 Suzuki
2013/0141740 A1  6/2013 Shimbaru

* cited by examiner

| REFERENCE COLOR SPACE | | | UNIFORM COLOR SPACE | | |
|---|---|---|---|---|---|
| L* | a* | b* | L* | a* | b* |
| 0 | -150 | -150 | XXX | XXX | XXX |
| 0 | -150 | -140.63 | XXX | XXX | XXX |
| 0 | -150 | -131.25 | XXX | XXX | XXX |
| ⋮ | ⋮ | ⋮ | ⋮ | ⋮ | ⋮ |
| 31.25 | 0 | 0 | XXX | XXX | XXX |
| 31.25 | 0 | 9.38 | XXX | XXX | XXX |
| ⋮ | ⋮ | ⋮ | ⋮ | ⋮ | ⋮ |
| 75 | 37.5 | 93.75 | XXX | XXX | XXX |
| 75 | 37.5 | 103.13 | XXX | XXX | XXX |
| ⋮ | ⋮ | ⋮ | ⋮ | ⋮ | ⋮ |
| 100 | 150 | 140.63 | XXX | XXX | XXX |
| 100 | 150 | 150 | XXX | XXX | XXX |

| INPUT VALUES | | | | OUTPUT VALUES | | | |
|---|---|---|---|---|---|---|---|
| C | M | Y | K | C | M | Y | K |
| 0 | 0 | 0 | 17 | XXX | XXX | XXX | XXX |
| 0 | 0 | 0 | 34 | XXX | XXX | XXX | XXX |
| 0 | 0 | 0 | 51 | XXX | XXX | XXX | XXX |
| ... | ... | ... | ... | ... | ... | ... | ... |
| 170 | 0 | 51 | 0 | XXX | XXX | XXX | XXX |
| 170 | 0 | 51 | 17 | XXX | XXX | XXX | XXX |
| ... | ... | ... | ... | ... | ... | ... | ... |
| 221 | 170 | 85 | 34 | XXX | XXX | XXX | XXX |
| 221 | 170 | 85 | 51 | XXX | XXX | XXX | XXX |
| ... | ... | ... | ... | ... | ... | ... | ... |
| 255 | 255 | 255 | 238 | XXX | XXX | XXX | XXX |
| 255 | 255 | 255 | 255 | XXX | XXX | XXX | XXX |

1502

| INPUT VALUES | | | | OUTPUT VALUES | | | |
|---|---|---|---|---|---|---|---|
| C | M | Y | K | C | M | Y | K |
| 0 | 0 | 0 | 17 | YYY | YYY | YYY | YYY |
| 0 | 0 | 0 | 34 | YYY | YYY | YYY | YYY |
| 0 | 0 | 0 | 51 | YYY | YYY | YYY | YYY |
| ... | ... | ... | ... | ... | ... | ... | ... |
| 170 | 0 | 51 | 0 | YYY | YYY | YYY | YYY |
| 170 | 0 | 51 | 17 | YYY | YYY | YYY | YYY |
| ... | ... | ... | ... | ... | ... | ... | ... |
| 221 | 170 | 85 | 34 | YYY | YYY | YYY | YYY |
| 221 | 170 | 85 | 51 | YYY | YYY | YYY | YYY |
| ... | ... | ... | ... | ... | ... | ... | ... |
| 255 | 255 | 255 | 238 | YYY | YYY | YYY | YYY |
| 255 | 255 | 255 | 255 | YYY | YYY | YYY | YYY |

1503

| INPUT VALUES | | | | OUTPUT VALUES | | | |
|---|---|---|---|---|---|---|---|
| C | M | Y | K | C | M | Y | K |
| 0 | 0 | 0 | 17 | ZZZ | ZZZ | ZZZ | ZZZ |
| 0 | 0 | 0 | 34 | ZZZ | ZZZ | ZZZ | ZZZ |
| 0 | 0 | 0 | 51 | ZZZ | ZZZ | ZZZ | ZZZ |
| ... | ... | ... | ... | ... | ... | ... | ... |
| 170 | 0 | 51 | 0 | ZZZ | ZZZ | ZZZ | ZZZ |
| 170 | 0 | 51 | 17 | ZZZ | ZZZ | ZZZ | ZZZ |
| ... | ... | ... | ... | ... | ... | ... | ... |
| 221 | 170 | 85 | 34 | ZZZ | ZZZ | ZZZ | ZZZ |
| 221 | 170 | 85 | 51 | ZZZ | ZZZ | ZZZ | ZZZ |
| ... | ... | ... | ... | ... | ... | ... | ... |
| 255 | 255 | 255 | 238 | ZZZ | ZZZ | ZZZ | ZZZ |
| 255 | 255 | 255 | 255 | ZZZ | ZZZ | ZZZ | ZZZ |

IMAGE PROCESSING APPARATUS, IMAGE PROCESSING METHOD, AND PROGRAM

BACKGROUND OF THE INVENTION

Field of the Invention

The present invention relates to an image processing apparatus for correcting colors output from a printer, an image processing method, and a program for generating image processing parameters.

Description of the Related Art

With the improvement in performance of electrophotographic apparatuses in recent years, a certain electrophotographic apparatus has achieved an image quality equivalent to the image quality of printing machines. However, such an electrophotographic apparatus shows a larger color variation amount than printing machines because of the instability peculiar to the electrophotographic apparatus.

To solve this problem, conventional electrophotographic apparatuses are provided with a "single color" calibration technique based on the generation of a lookup table (LUT) for correcting one-dimensional gradation characteristics corresponding to each of cyan, magenta, yellow, and black toners (hereinafter referred to as C, M, Y, and K toners, respectively). A LUT is a table indicating output data corresponding to input data divided at specific intervals. The LUT enables representing nonlinear characteristics which cannot be represented by calculation formulas. "Monochrome" refers to a color represented by using any one of C, M, Y, and K toners. Executing single color calibration corrects the single color reproduction characteristics, such as the maximum density and gradation.

In recent years, Japanese Patent Application Laid-Open No. 2011-254350 discusses a technique for performing "multi color" calibration by using a four-dimensional LUT. "Multi color" refers to colors represented by using a plurality of toners such as red, green, blue, and CMY-based gray. Particularly in electrophotography, even if the gradation characteristics of single colors are corrected by using a one-dimensional LUT, representing "multi color" by using a plurality of toners causes a nonlinear difference in many cases. In this case, executing multi color calibration corrects the color reproduction characteristics of multi color represented by a combination (for example, superposition) of a plurality of color toners.

A method of calibration involving "multi color" will be described below. First of all, to perform "single color" calibration, the method prints out patches on a recording medium such as paper by using single color chart data, and reads the patches by using a scanner or sensor. The method compares data acquired by reading the patches with preset target values, and generates a one-dimensional LUT for correcting differences of the data from the target values. Subsequently, to perform "multi color" calibration, the method prints out patches on a recording medium by using multi color chart data reflecting the generated one-dimensional LUT, and reads the patches by using a scanner or sensor. The method compares data acquired by reading the patches with preset target values, and generates a four-dimensional LUT for correcting differences of the data from the target values.

As described above, high-precision correction was possible by correcting the multi color characteristics through "multi color" calibration, which cannot be corrected only through "single color" calibration.

However, a prior art uses an "L*a*b* color space" for "multi color" calibration and therefore is affected by "distortion" included in the "L*a*b* color space" itself.

Although the "L*a*b* color space" aims to make a correlation with the human visual characteristics, it tends to be difficult to make a correlation in specific hues. For example, a color perceived as "purple" by the human eye may be represented as "blue" in the "L*a*b* color space."

In "multi color" calibration, the method calculates linear distances of differences in the "L*a*b* color space" and then performs correction. This processing causes the following problem. Although correction is completed on a numerical basis, the human eye perceives that certain colors in a printout have not been sufficiently corrected because of an influence of "distortion" peculiar to the "L*a*b* color space.

SUMMARY OF THE INVENTION

An image processing apparatus according to the present invention includes a conversion table for converting a first color space into a uniform color space, a unit configured to output a chart to a printer by using a plurality of types of multi color chart data represented in a three-dimensional color space formed of cyan, magenta, and yellow, a unit configured to acquire colorimetric values resulting from colorimetry performed on the output chart in the first color space, a unit configured to acquire a first color conversion table for converting a three-dimensional color space into a uniform color space, a conversion unit configured to convert the acquired colorimetric values of the first color space into colors of the uniform color space by using the conversion table, a unit configured to acquire predetermined target values of the uniform color space, a unit configured to correct a second color conversion table for converting a uniform color space into a three-dimensional color space by using the acquired colorimetric values of the uniform color space, the acquired target values of the uniform color space, and the second color conversion table, and a generation unit configured to generate a color conversion table for correcting a four-dimensional color space formed of cyan, magenta, yellow, and black by using the first color conversion table and the corrected second color conversion table.

According to the present invention, it becomes possible to perform correction adapted to the human visual characteristics without being affected by "distortion" peculiar to the "L*a*b* color space" at the time of multi color calibration.

Further features of the present invention will become apparent from the following description of exemplary embodiments with reference to the attached drawings.

BRIEF DESCRIPTION OF THE DRAWINGS

FIG. 7 is a table illustrating examples of parameters for converting an L*a*b* reference color space into an L*a*b* "uniform color space" according to the first exemplary embodiment.

FIG. 15 illustrates examples of 4D-LUTs according to the third and the fourth exemplary embodiments.

DESCRIPTION OF THE EMBODIMENTS

Various exemplary embodiments, features, and aspects of the invention will be described in detail below with reference to the drawings.

A first exemplary embodiment of the present invention will be described below. The present exemplary embodiment will be described below based on a technique for performing correction adapted to the human visual characteristics. Specifically, at the time of multi color calibration, the technique converts an "L*a*b* color space" into a "uniform color space" creating less "distortion" before performing correction.

Figure 1:
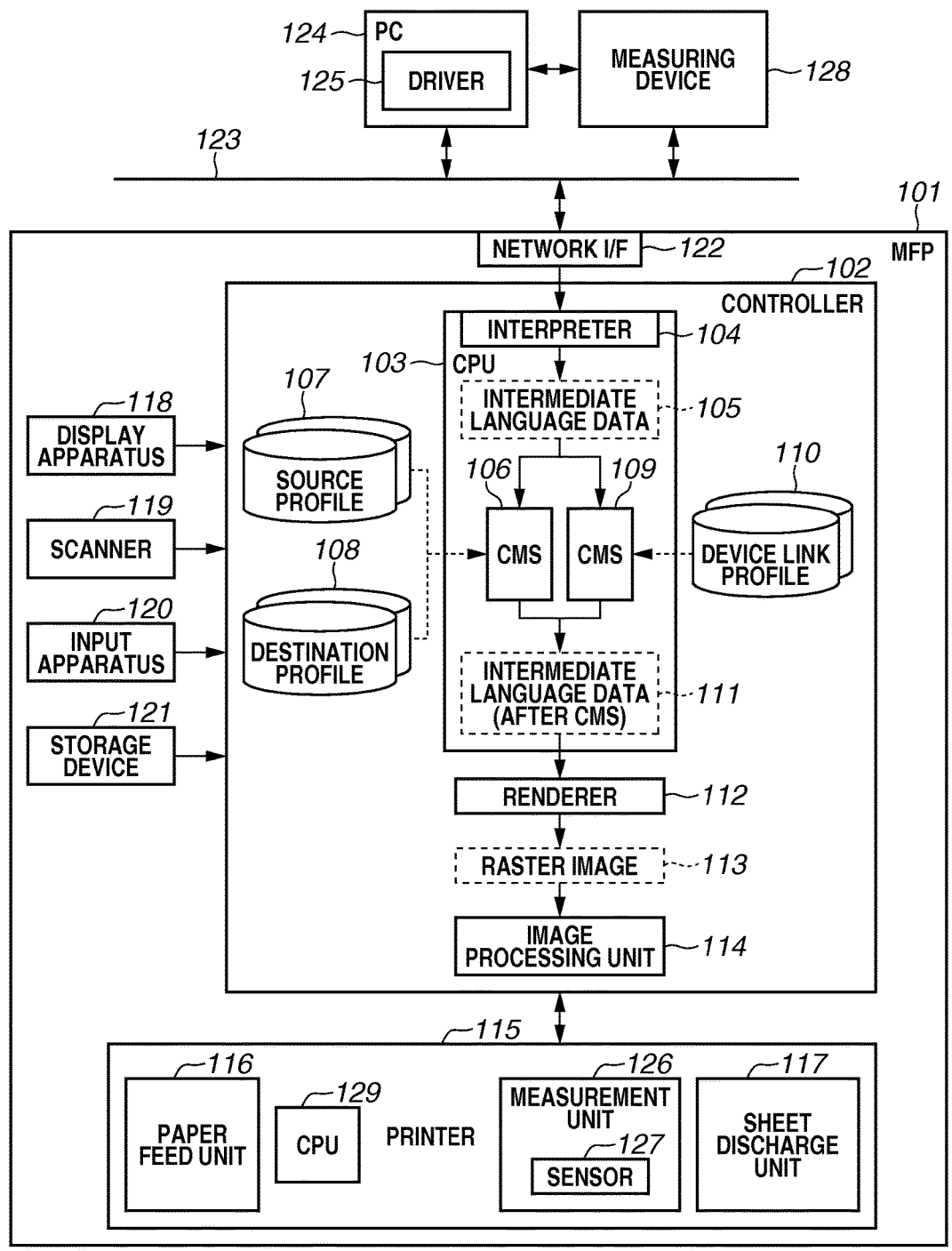
FIG. 1 illustrates a system configuration.

FIG. 1 illustrates a configuration of a system according to the present exemplary embodiment. A multi function printer (MFP) 101 as an image processing apparatus using cyan, magenta, yellow, and black toners (hereinafter referred to as C, M, Y, and K toners, respectively) is connected with other network-based apparatuses via a network 123. A personal computer (PC) 124 is connected with the MFP 101 via the network 123. A printer driver 125 in the PC 124 transmits print data to the MFP 101.

The MFP 101 will be described in detail below. A network interface (I/F) 122 receives print data. A controller 102 includes a central processing unit (CPU) 103, a renderer 112, and an image processing unit 114. An interpreter 104 in the CPU 103 interprets a page description language (PDL) portion of the received print data to generate intermediate language data 105.

A color management system (CMS) 106 performs color conversion by using a source profile 107 and a destination profile 108 to generate intermediate language data (after CMS) 111. The CMS 106 performs color conversion by using profile information (described below). The source profile 107 is a profile for converting a device-dependent color space, such as red, green, and blue (RGB), and cyan, magenta, yellow, and black (CMYK), into a device-independent color space such as L*a*b* (hereinafter referred to as Lab) defined by the International Commission on Illumination (CIE) and XYZ. XYZ is a device-independent color space similar to Lab, and expresses colors with three different stimulus values. The destination profile 108 is a profile for converting a device-independent color space into a device (printer 115)-dependent CMYK color space.

On the other hand, a CMS 109 performs color conversion by using a device link profile 110 to generate intermediate language data (after CMS) 111. The device link profile 110 is a profile for directly converting a device-dependent color space such as RGB and CMYK into a device (printer 115)-dependent CMYK color space. Which CMS (CMS 106 or CMS 109) is selected depends on a setting in the printer driver 125.

Although, in the present exemplary embodiment, the CMS 106 or the CMS 109 is selected according to the type of profile (profile 107, 108, or 110), only one CMS may also handle a plurality of profile types. The types of profiles are not limited to the ones described in the present exemplary embodiment, and may be any type of profile as long as a device (printer 155)-dependent CMYK color space is used.

The renderer 112 generates a raster image 113 based on the generated intermediate language data (after CMS) 111. The image processing unit 114 performs image processing on the raster image 113 or an image read by the scanner 119. The image processing unit 114 will be described in detail below.

The printer 115 connected with the controller 102 is a printer for forming an image on paper based on output data by using color toners, such as C, M, Y, and K toners. The printer 115 includes a paper feed unit 116 for feeding sheets, a sheet discharge unit 117 for discharging sheets with images formed thereon, and a measurement unit 126 for performing colorimetry.

The measurement unit 126 includes a sensor 127 for acquiring the spectral reflectance and values of a device-independent color space such as Lab and XYZ. The measurement unit 126 is controlled by the CPU 129 for controlling the printer 115. The measurement unit 126 reads, by using the sensor 127, patches printed out on a recording media such as a print sheet by the printer 115, and transmits read numerical information to the controller 102. The controller 102 performs calculation by using the numerical information, and uses the result of the calculation when performing single color calibration or multi color calibration.

A display unit 118 is a user interface (UI) for displaying an instruction to the user and the status of the MFP 101. The display unit 118 is used when performing single color calibration or multi color calibration (described below).

The scanner 119 includes an automatic document feeder. When the scanner 119 irradiates a stack of document images or one document image with light from a light source (not illustrated), a document-reflected image is formed on a solid-state image sensor such as a charge coupled device (CCD) sensor through a lens. Then, the scanner 119 acquires as image data a read signal of a rasterized image from the solid-state image sensor.

An input unit 120 is an interface for receiving an input from the user. A part of the input unit 120 may be configured as a touch panel and integrated with the display unit 118.

A storage device 121 stores data processed by the controller 102 and data received by the controller 102.

A measuring device 128 is an external measurement device connected to the network 123 or the PC 124. Similar to the measurement unit 126, the measuring device 128 enables acquiring the spectral reflectance and values of a device-independent color space such as Lab and XYZ.

Figure 2:
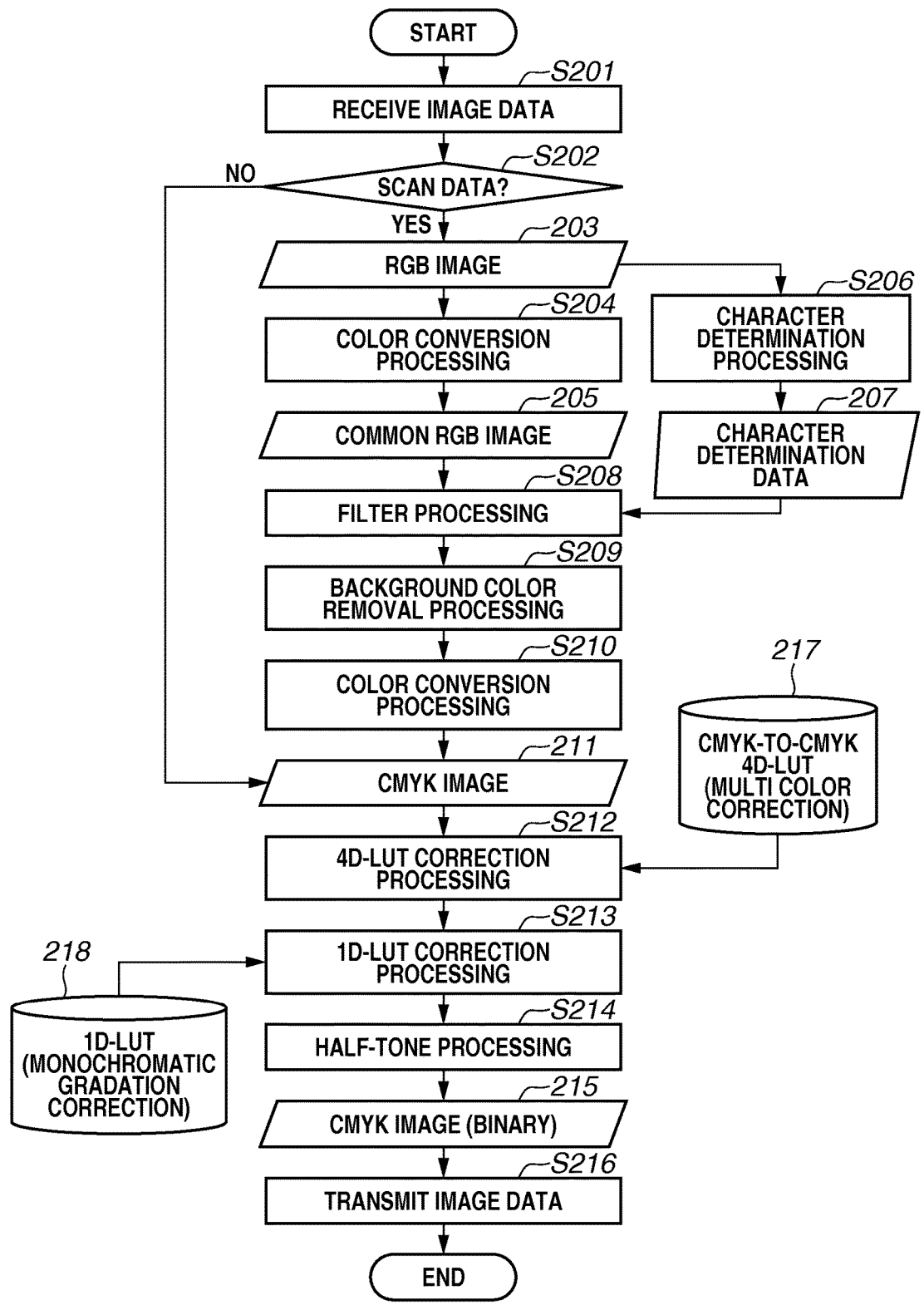
FIG. 2 is a flowchart illustrating image processing.

A processing flow performed by the image processing unit 114 will be described below with reference to FIG. 2. FIG. 2 illustrates an image processing flow performed on the raster image 113 or an image read by the scanner 119. The processing flow illustrated in FIG. 2 is performed when an application specific integrated circuit (ASIC) (not illustrated) in the image processing unit 114 executes the flow.

In step S201, the image processing unit 114 receives image data. In step S202, the image processing unit 114 determines whether the received data is scan data received from the scanner 119 or the raster image 113 transmitted from the printer driver 125.

When the received data is determined to be not the relevant scan data (NO in step S202), the image processing unit 114 determines the received data as the raster image 113 bit-map-expanded by the renderer 112. The CMS converts the raster image 113 into a printer device-dependent CMYK image, i.e., a CMYK image 211.

When the received data is determined to be the relevant scan data (YES in step S202), the image processing unit 114 determines the received data as an RGB image 203. Then, in step S204, the image processing unit 114 performs color conversion processing on the RGB image 203 to generate a common RGB image 205. The common RGB image 205 is defined in a device-independent RGB color space, which can be converted into a device-independent color space such as Lab through calculation.

Meanwhile, in step S206, the image processing unit 114 performs character determination processing on the RGB image 203 to generate character determination data 207. In this case, the image processing unit 114 detects edges of the RGB image 203 to generate the character determination data 207.

In step S208, the image processing unit 114 performs filter processing on the common RGB image 205 by using the character determination data 207. In this case, by using the character determination data 207, the image processing unit 114 performs different filter processing between text portions and non-text portions.

In step S209, the image processing unit 114 performs background color removal processing. In step S210, the image processing unit 114 performs color conversion processing to generate the CMYK image 211 with the background color removed.

In step S212, the image processing unit 114 performs multi color correction processing by using a 4D-LUT 217. A 4D-LUT refers to a four-dimensional lookup table (LUT) for converting a combination of C, M, Y, and K signal values in outputting each of C, M, Y, and K toners, into a combination of different C, M, Y, and K signal values. The 4D-LUT 217 is generated through "multi color calibration" (described below). The use of the 4D-LUT enables correcting "multi color" which is generated by using a plurality of toners.

After performing multi color correction in step S212, then in step S213, the image processing unit 114 corrects the gradation characteristics of each of the C, M, Y, and K single colors by using a 1D-LUT 218. A 1D-LUT refers to a one-dimensional lookup table (LUT) for correcting each of the C, M, Y, and K single colors. The 1D-LUT 218 is generated through "single color calibration" (described below).

In step S214, the image processing unit 114 performs half-tone processing such as screen processing and error diffusion processing to generate a CMYK image (binary) 215. In step S216, the image processing unit 114 transmits resultant image data to the printer 115.

"Monochromatic calibration" for correcting the gradation characteristics of the single colors output from the printer 115 will be described below with reference to FIG. 3. Performing single color calibration enables correcting the color reproduction characteristics of the single color, such as maximum density characteristics and gradation characteristics. The color reproduction characteristics corresponding to each of the C, M, Y, and K single colors used for the printer 115 are corrected together during execution of calibration. More specifically, the processing illustrated in FIG. 3 is executed at one time for each of the C, M, Y, and K single colors.

Figure 3:
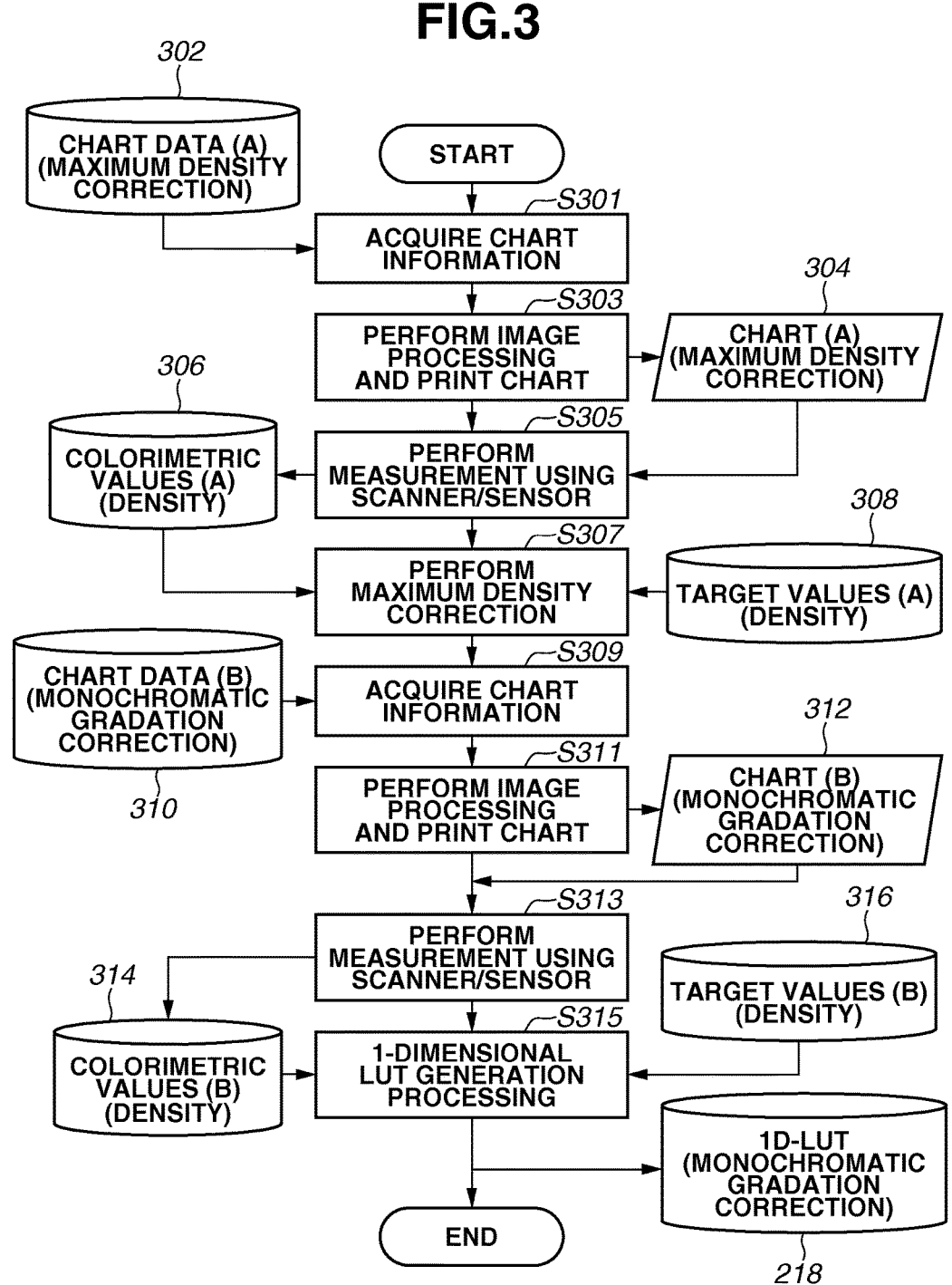
FIG. 3 is a flowchart illustrating single color calibration processing.

FIG. 3 is a flowchart illustrating processing for generating the 1D-LUT 218 for correcting the gradation characteristics of the single colors. The processing flow illustrated in FIG. 3 is performed when the CPU 103 executes the processing. The generated 1D-LUT 218 is stored in the storage device 121. The display unit 118 displays an instruction to the user on a UI, and receives a user instruction from the input unit 120.

In step S301, the CPU 103 acquire chart data (A) 302 stored in the storage device 121. The chart data (A) 302 is used to correct the maximum density for each single color, and includes signal values (for example, 255) for acquiring the maximum density data of the C, M, Y, and K "single colors."

Figure 5A:
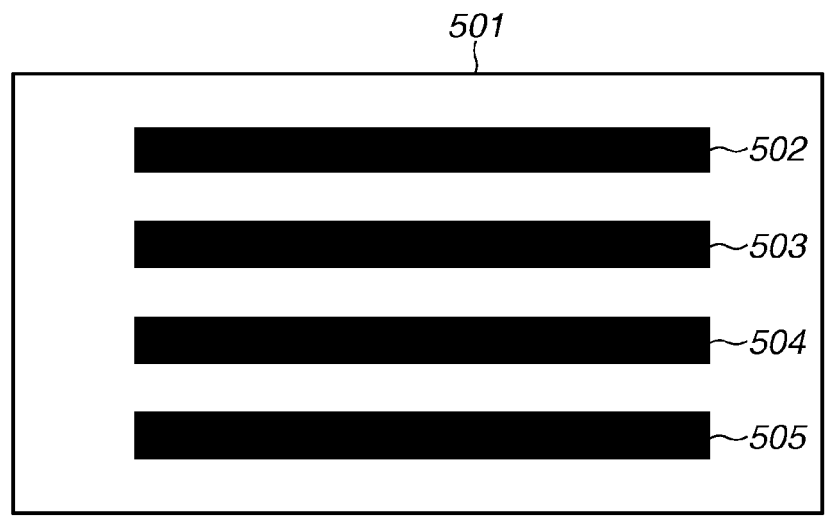
FIGS. 5A, 5B, and 5C illustrate charts used for single color and multi color calibrations.
Figure 5B:
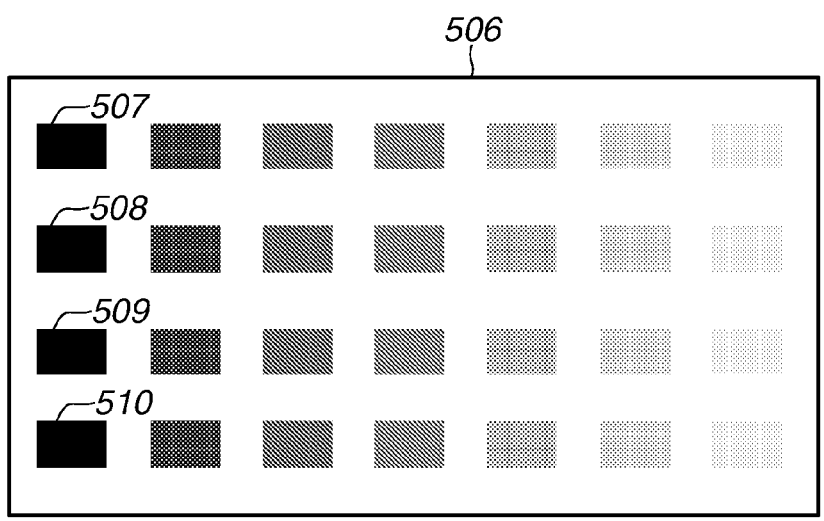
Figure 5C:
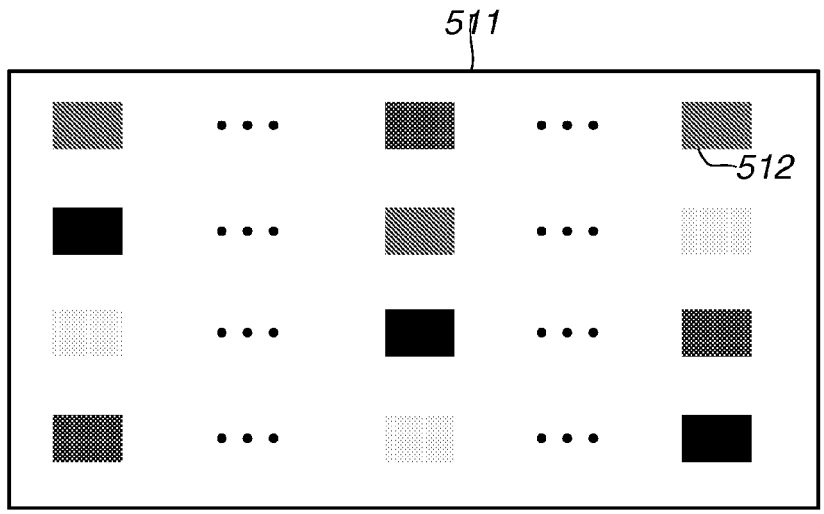

In step S303, the CPU 103 executes image processing on the chart data (A) 302 via the image processing unit 114, and prints out a chart (A) 304 from the printer 115. Examples of charts are illustrated in FIGS. 5A, 5B, and 5C. A chart 501 illustrated in FIG. 5A is an example of a printout of the chart data (A) 302. Patches 502, 503, 504, and 505 are printed out with the maximum density for each of the C, M, Y, and K colors, respectively. In this case, the image processing unit 114 performs only the half-tone processing in step S214, and performs neither the 1D-LUT correction processing in step S213 nor the 4D-LUT correction processing in step S212.

In step S305, the CPU 103 executes density measurement (colorimetry) on a printout of the chart (A) 304 by using the scanner 119 or the sensor 127 in the measurement unit 126 to acquire colorimetric values (A) 306. The colorimetric values (A) 306 include density values of the C, M, Y, and K colors. In step S307, the CPU 103 corrects the maximum density of the colorimetric values (A) 306 for each color by using the colorimetric values (A) 306 and preset target values (A) 308 for the maximum density values. In this case, the CPU 103 adjusts device setting values of the printer 115, such as laser output and development bias so that the maximum densities come close to the target values (A) 308.

In step S309, the CPU 103 acquires chart data (B) 310 stored in the storage device 121. The chart data (B) 310 includes signal values for gradation data of the C, M, Y, and K "single colors". FIGS. 5A, 5B, and 5C illustrate examples of a chart (B) 312 having patches printed out on a recording medium by using the chart data (B) 310. A chart 506 illustrated in FIG. 5B is an example of the chart (B) 312 having patches printed out on a recording medium by using the chart data (B) 310. Patches 507, 508, 509, and 510 and gradation data extending to the right illustrated in FIG. 5B include gradation data for each of the C, M, Y, and K colors.

In step S311, the CPU 103 executes image processing on the chart data (B) 310 via the image processing unit 114, and prints out the chart (B) 312 on the printer 115. In this case, the image processing unit 114 performs only half-tone processing in step S214, and performs neither the 1D-LUT correction processing in step S213 nor the D-LUT correction processing in step S212. Since the maximum densities are corrected for the printer 115 in step S307, the maximum densities equivalent to the target values (A) 308 can be achieved.

In step S313, the CPU 103 executes colorimetry by using the scanner 119 or the sensor 127 to acquire colorimetric values (B) 314. The colorimetric values (B) 314 are density values acquired from gradation for each of the C, M, Y, and K colors. In step S315, the CPU 103 generates the 1D-LUT 218 for correcting gradation of the single colors by using the colorimetric values (B) 314 and preset target values (B) 316.

"Multi color calibration" for correcting the characteristics of multi colors output from the printer 115 will be described below with reference to FIG. 4. Performing multi color calibration enables correcting the reproduction characteristics of multi color represented by a combination (superposition) of a plurality of color toners. The following processing flow is implemented by the CPU 103 in the controller 102 executing the processing. The acquired 4D-LUT 217 is stored in the storage device 121. The display unit 118 displays an instruction to the user on a UI, and receives a user instruction from the input unit 120.

Multi color calibration corrects multi colors output from the printer 115 after completion of single color calibration. Therefore, it is desirable to perform multi color calibration immediately after completion of single color calibration.

In step S401, the CPU 103 acquires information about "multi color" chart data (C) 402 stored in the storage device 121. The chart data (C) 402 is data for correcting multi colors, and includes signal values of "multi color" which is a combination of the C, M, and Y colors. FIGS. 5A, 5B, and 5C illustrate examples of a chart (C) 404 having patches printed out on a recording medium by using the chart data (C) 402. A chart 511 illustrated in FIG. 5C indicates an example of a printout of the chart data (C) 402. A patch 512 and all other patches printed out on the chart 511 include multi colors represented in a three-dimensional color space formed of the C, M, and Y colors.

In step S403, the CPU 103 executes image processing on the chart data (C) 402 via the image processing unit 114, and prints out the chart (C) 404 on the printer 115. At the time of multi color calibration, to correct the multi color characteristics of the device after completion of single color calibration, the image processing unit 114 uses the 1D-LUT 218, generated at the time of single color calibration, to perform image processing.

In step S405, the CPU 103 executes multi color colorimetry on the printout of the chart (C) 404 by using the scanner 119 or the sensor 127 in the measurement unit 126 to acquire colorimetric values (C) 406. The colorimetric values (C) 406 indicate the multi color characteristics of the printer 115 after completion of single color calibration. The colorimetric values (C) 406 are values in a device-independent color space which is Lab in the present exemplary embodiment. When the scanner 119 is used, the CPU 103 converts RGB values into Lab values by using a 3D-LUT (not illustrated).

In step S407, the CPU 103 acquires a Lab-to-CMY 3D-LUT (color conversion table) 409 stored in the storage device 121. Then, the CPU 103 reflects the differences of the colorimetric values (C) 406 from preset target values (C) 408 to the Lab-to-CMY 3D-LUT 409 to generate a Lab-to-CMY 3D-LUT (after correction) 410. A Lab-to-CMY 3D-LUT refers to a three-dimensional LUT for outputting CMY values corresponding to input Lab values.

A specific method for generating a 3D-LUT will be described below. The CPU 103 adds the differences between the colorimetric values (C) 406 and the preset target values (C) 408 to Lab values on the input side of the Lab-to-CMY 3D-LUT 409, and executes interpolation operation on Lab values, to which differences are reflected, by using the Lab-to-CMY 3D-LUT 409. As a result, the Lab-to-CMY 3D-LUT (after correction) 410 is generated.

In step S411, the CPU 103 acquires the CMY-to-Lab 3D-LUT (color conversion table) 412 stored in the storage device 121, and executes calculation by using the Lab-to-CMY 3D-LUT (after correction) 410. Thus, the CMYK-to-CMYK 4D-LUT 217 is generated. A CMY-to-Lab 3D-LUT refers to a three-dimensional LUT for outputting Lab values corresponding to input CMY values.

A specific method for generating the CMYK-to-CMYK 4D-LUT 217 will be described below. The CPU 103 generates a CMY-to-CMY 3D-LUT based on the CMY-to-Lab 3D-LUT 412 and the Lab-to-CMY 3D-LUT (after correction) 410. Then, the CPU 103 generates the CMYK-to-CMYK 4D-LUT 217 so that input values of the K color coincide with output values thereof. The CMY-to-CMY 3D-LUT refers to a three-dimensional LUT for outputting corrected CMY values corresponding to input CMY values.

However, the conventional technique calculates the differences between the colorimetric values (C) 406 and the target values (C) 408 in the Lab color space. Therefore, because of the influence of "distortion" included in the "Lab color space" itself, the human sense may perceive different colors in specific hues.

For example, even if the differences in the Lab color space are decreased, it may be determined that blue has not been sufficiently corrected while red is perceived to have been corrected when the human sense feels the effect of correction. The present exemplary embodiment proposes a technique for solving the above-described problem.

Figure 6:
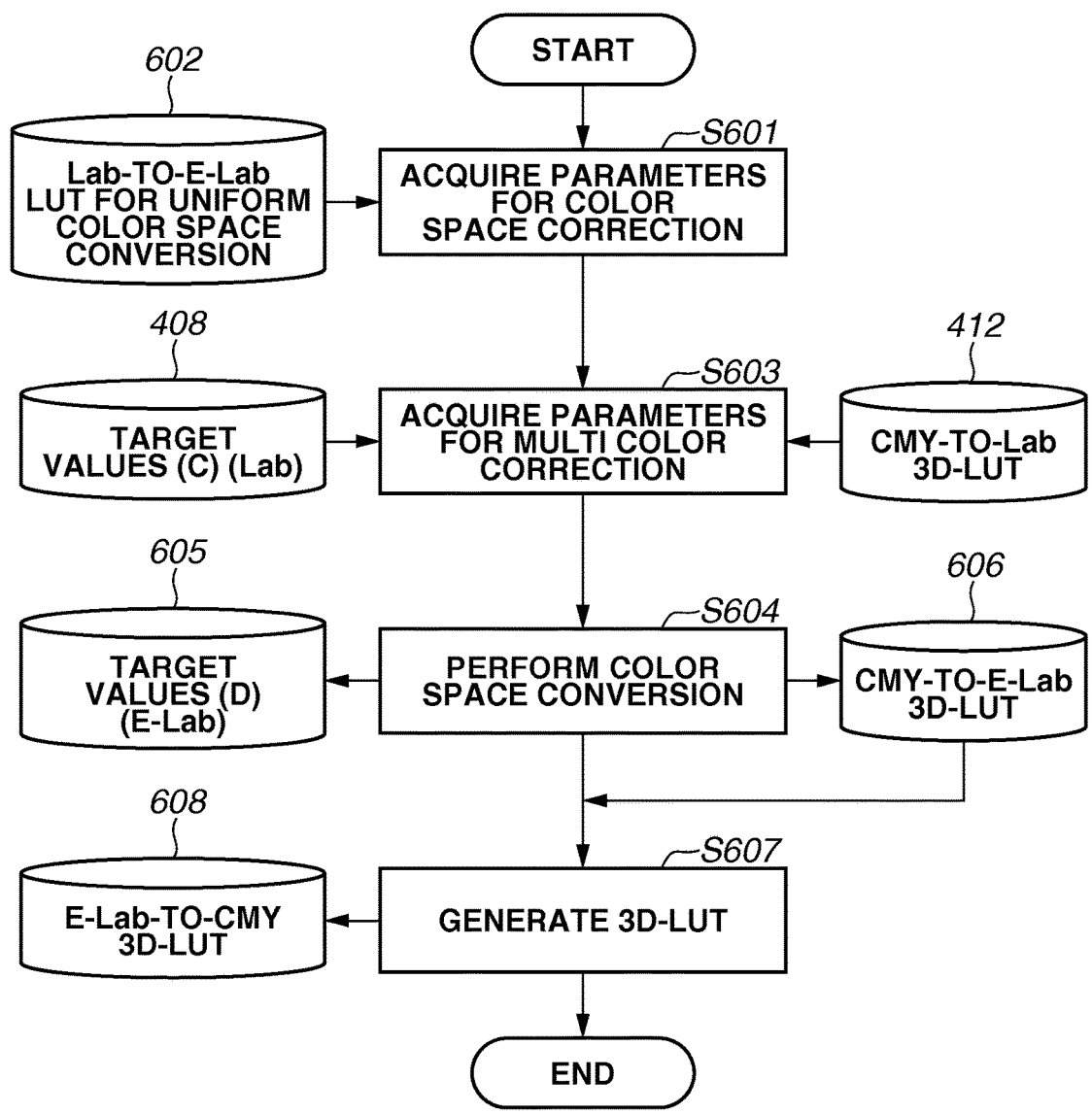
FIG. 6 is a flowchart illustrating processing for generating parameters for multi color calibration according to a first exemplary embodiment.

FIG. 6 is a flowchart illustrating processing for generating parameters for multi color calibration according to the present exemplary embodiment. The following processing flow is implemented by the CPU 103 in the controller 102 executing the processing. The acquired data is stored in the storage device 121. The display unit 118 displays an instruction to the user on a UI, and receives a user instruction from the input unit 120.

In step S601, the CPU 103 acquires a LUT for uniform color space conversion 602 which is a uniform color space conversion table stored in the storage device 121. The LUT for uniform color space conversion 602 provides parameters for color space conversion.

The "uniform color space" will be described below. The "uniform color space" is a color space in which "distortion" included in the Lab color space is corrected to improve the correlativity with the human visual characteristics.

Parameters for converting a Lab color space into a uniform color space can be generated by inputting data representing the visual uniformity in each of a plurality of color areas in the Lab color space. A method for generating a uniform color space is discussed in detail in Japanese Patent Application Laid-Open No. 2013-021679.

FIG. 7 illustrates examples of parameters for converting a reference color space into a "uniform color space." Conversion parameters 701 form a 3D-LUT for converting a Lab reference color space into a Lab uniform color space (hereinafter referred to as "E-Lab"). Input Lab values can be converted into E-Lab values corresponding to a uniform color space by performing interpolation operation using the conversion parameters 701. Changes from Lab values to E-Lab values after conversion are different for each hue. More specifically, blue having a large distortion in Lab values shows large changes, and an achromatic color having a small distortion in Lab values shows small changes.

In step S603, the CPU 103 acquires the target values (C) 408 and the CMY-to-Lab 3D-LUT 412 stored in the storage device 121. These parameters are the same as those used in the processing flow illustrated in FIG. 4.

In step S604, by using the LUT for uniform color space conversion 602, the CPU 103 converts the target values (C) 408 and the CMY-to-Lab 3D-LUT 412 into target values (D) 605 and a CMY-to-E-Lab 3D-LUT 606, respectively.

Finally, the CPU 103 executes 3D-LUT generation processing by using the CMY-to-E-Lab 3D-LUT 606 to generate an E-Lab-to-CMY 3D-LUT 608. A method for generating a Lab-to-CMY 3D-LUT is discussed in Japanese Patent Application Laid-Open No. 2011-254350. A Lab-to-CMY 3D-LUT is generated by using a CMY-to-Lab 3D-LUT. The Lab-to-CMY 3D-LUT is corrected by using the Lab-to-CMY 3D-LUT, target values, and colorimetric values of output chart data. Therefore, similar to the Lab-to-CMY 3D-LUT which is generated by using the CMY-to-Lab 3D-LUT, an E-Lab-to-CMY 3D-LUT is generated by using the CMY-to-E-Lab 3D-LUT.

As described above, it becomes possible to generate parameters with corrected "distortion" in specific hues peculiar to the Lab color space by converting conventional Lab values into E-Lab values of the uniform color space and then generating parameters.

Figure 8:
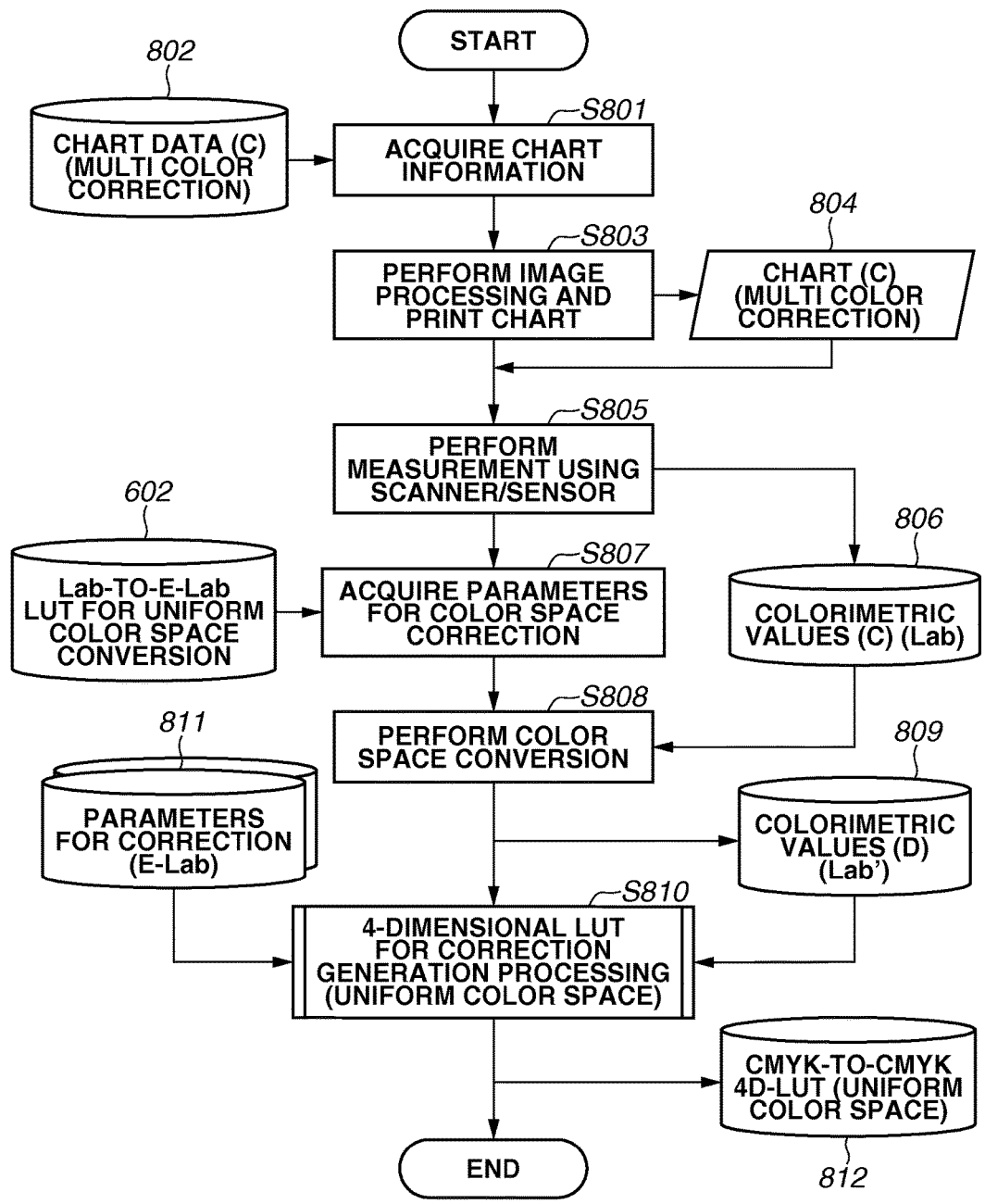
FIG. 8 is a flowchart illustrating multi color calibration processing according to the first exemplary embodiment.

FIG. 8 is a flowchart illustrating multi color calibration processing according to the present exemplary embodiment. The CPU 103 executes multi color calibration processing by using the parameters generated in FIG. 6. The following processing flow is implemented by the CPU 103 in the controller 102 executing the processing. The acquired data is stored in the storage device 121. The display unit 118 displays an instruction to the user on a UI, and receives a user instruction from the input unit 120.

Figure 4:
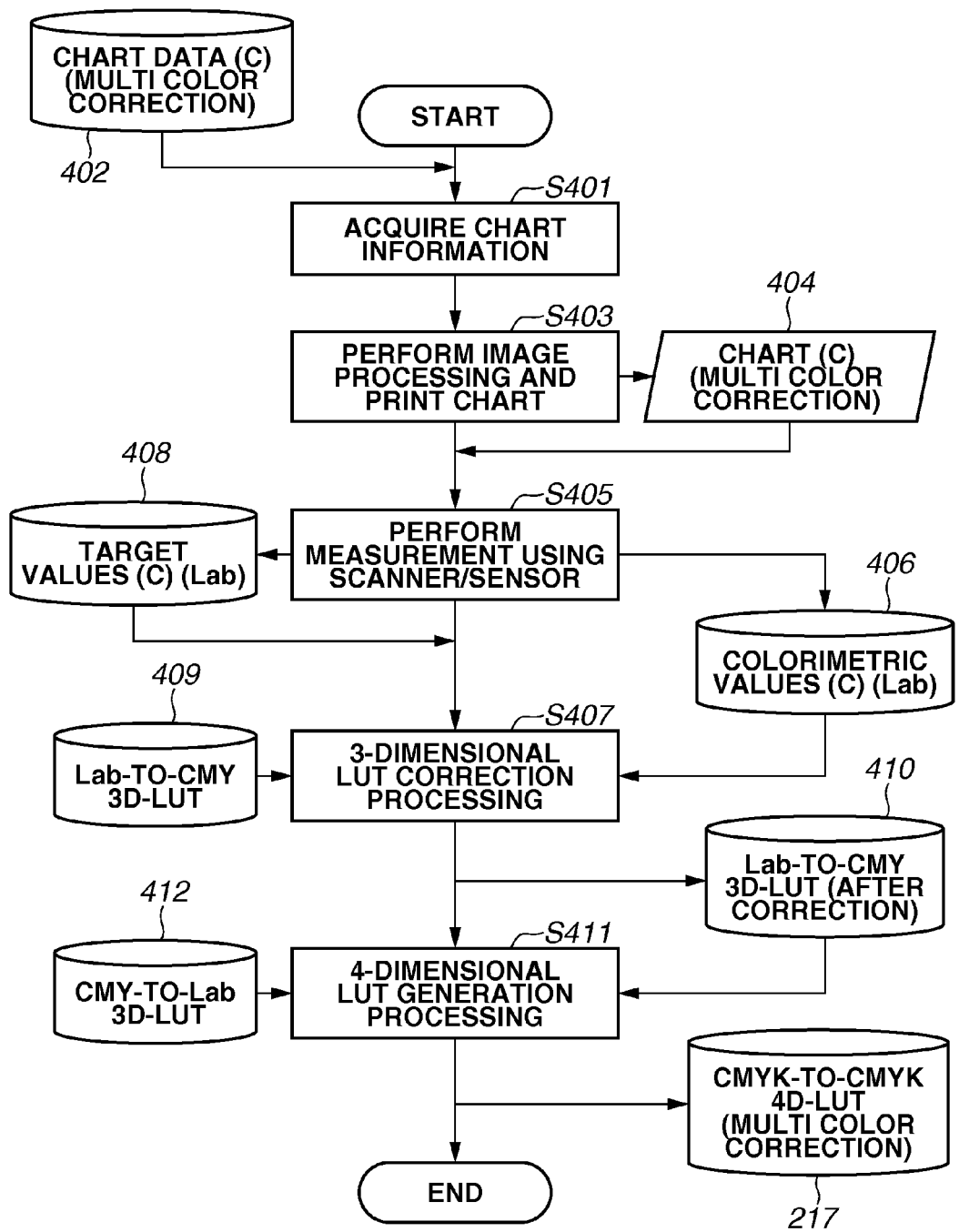
FIG. 4 is a flowchart illustrating multi color calibration processing.

The processing flow for acquiring colorimetric values (C) 806 in steps S801 to S805 is similar to the processing flow for acquiring the colorimetric values (C) 406 in steps S401 to S405 illustrated in FIG. 4, therefore, redundant description thereof will be omitted.

In step S807, the CPU 103 acquires the LUT for uniform color space conversion 602 stored in the storage device 121. In step S808, the CPU 103 executes color conversion on the colorimetric values (C) 806 by using the LUT for uniform color space conversion 602 to acquire colorimetric values (D) 809.

Finally, in step S810, the CPU 103 executes processing for generating a four-dimensional LUT for correction by using the colorimetric values (D) 809 and the parameters for correction 811 to acquire a CMYK-to-CMYK 4D-LUT (uniform color space) 812. The parameters for correction 811 include the target values (D) 605, the CMY-to-E-Lab 3D-LUT 606, and the E-Lab-to-CMY 3D-LUT 608 generated in the processing illustrated in FIG. 6. The processing in step S810 is similar to the processing in steps S407 and S411 illustrated in FIG. 4, therefore, redundant description thereof will be omitted.

As described above, unifying both parameters and colorimetric values with E-Lab values of the uniform color space and then generating a 4D-LUT for multi color correction enables solving the problem of "distortion" in specific hues which occurs in the conventional technique.

Although, in the present exemplary embodiment, a 3D-LUT is used for uniform color space conversion, other methods such as a matrix may be used for uniform color space conversion. Further, any type of color space may be used as long as the problem in the conventional Lab color space can be solved.

According to the present exemplary embodiment, it becomes possible to perform correction adapted to the human visual characteristics without being affected by "distortion" peculiar to the "Lab color space" at the time of multi color calibration.

The following describes a second exemplary embodiment in which either one of two different modes is selected at the time of multi color calibration. In one mode, differences in the conventional Lab color space are prioritized. In the other mode, correction is performed according to the human visual characteristics without correcting "distortion" peculiar to the Lab color space.

In the above-described first exemplary embodiment, conventional Lab values are converted into E-Lab values of the uniform color space, and multi color calibration is performed by using parameters pregenerated based on E-Lab values.

However, evaluating the result output by using a 4D-LUT corrected with E-Lab values of the uniform color space may increase a color difference ($\Delta E$). The color difference ($\Delta E$) refers to a difference between two colors, and is calculated by using the following formula (1).

$$\Delta E = \sqrt{(L_1-L_2)^2 + (a_1-a_2)^2 + (b_1-b_2)^2} \quad \text{Formula (1)}$$

($L_1$, $a_1$, $b_1$: Lab values of color 1; $L_2$, $a_2$, $b_2$: Lab values of color 2)

Although a color which does not conform to the human visual characteristics actually occurs, the color difference ($\Delta E$) is an evaluation index used in the standards. Depending on the type of user's printout, whether the color differences ($\Delta E$) satisfy standard values may be more important than whether colors conform to the human visual characteristics. Depending on the print purpose, for example, standard values of the color differences ($\Delta E$) are "about 1.5 or less" and "about 3.0 or less." Therefore, there arises a problem of an increase in risk that the standard values of the color differences ($\Delta E$) cannot be satisfied after performing correction with E-Lab values of the uniform color space. For example, when outputting an RGB image, a monitor is used for reference. In some case, therefore, performing correction adapted to the human visual characteristics is more important than performing correction according to the color differences ($\Delta E$). When outputting a CMYK image, importance is attached to the extent to which a printout can be brought close to a reference print product. In some case, therefore, determination is made depending on whether the standard values of the color differences ($\Delta E$) can be satisfied.

Further, some users attach importance to performing correction adapted to the human visual characteristics of a person who prints photograph images. Therefore, taking the above-described situation into consideration, the present exemplary embodiment will be described below based on a case where the user is prompted to select whether to use E-Lab values of the uniform color space before performing multi color calibration processing.

Figure 9:
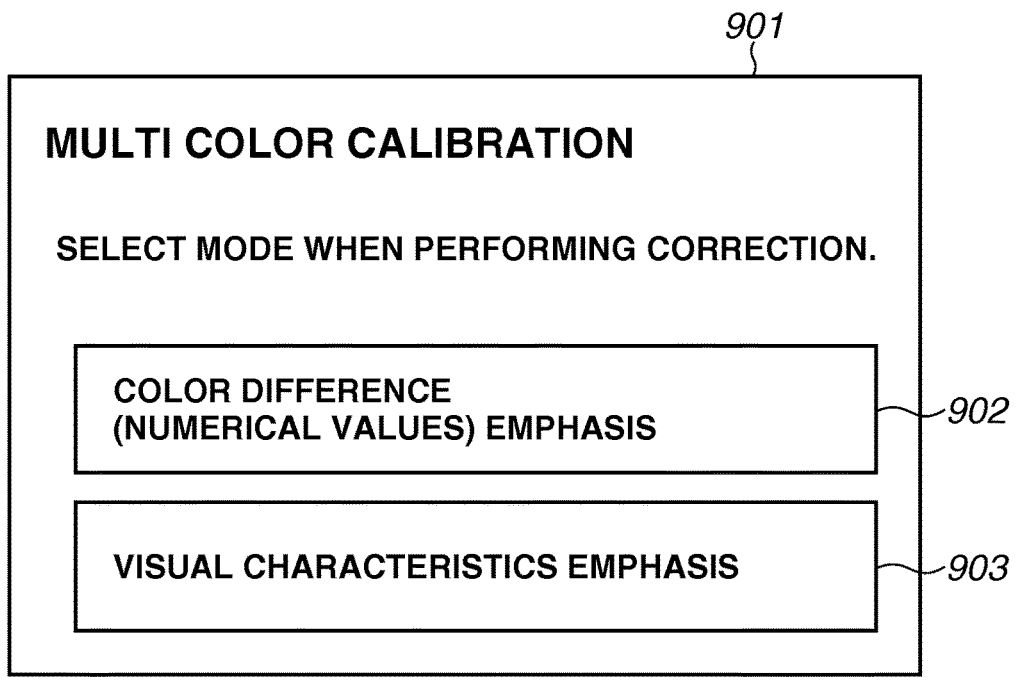
FIG. 9 illustrates an example of a user interface (UI) for prompting a user to select a correction mode at the time of multi color calibration according to a second exemplary embodiment.

FIG. 9 illustrates an example of a UI according to the present exemplary embodiment. A UI 901 is displayed on the display unit 118 before execution of multi color calibration. Since the frequency of selection depends on the usage status of the user, the UI 901 does not need to be displayed each time multi color calibration is performed. The UI 901 may be displayed as an independent menu. When the "COLOR DIFFERENCE (NUMERICAL VALUE) EMPHASIS" button 902 is selected, a 4D-LUT for multi color correction is generated by using conventional Lab values when performing multi color calibration. On the other hand, when the "VISUAL CHARACTERISTICS EMPHASIS" button 903 is selected, a 4D-LUT for multi color correction is generated by using E-Lab values of the uniform color space.

Figure 10:
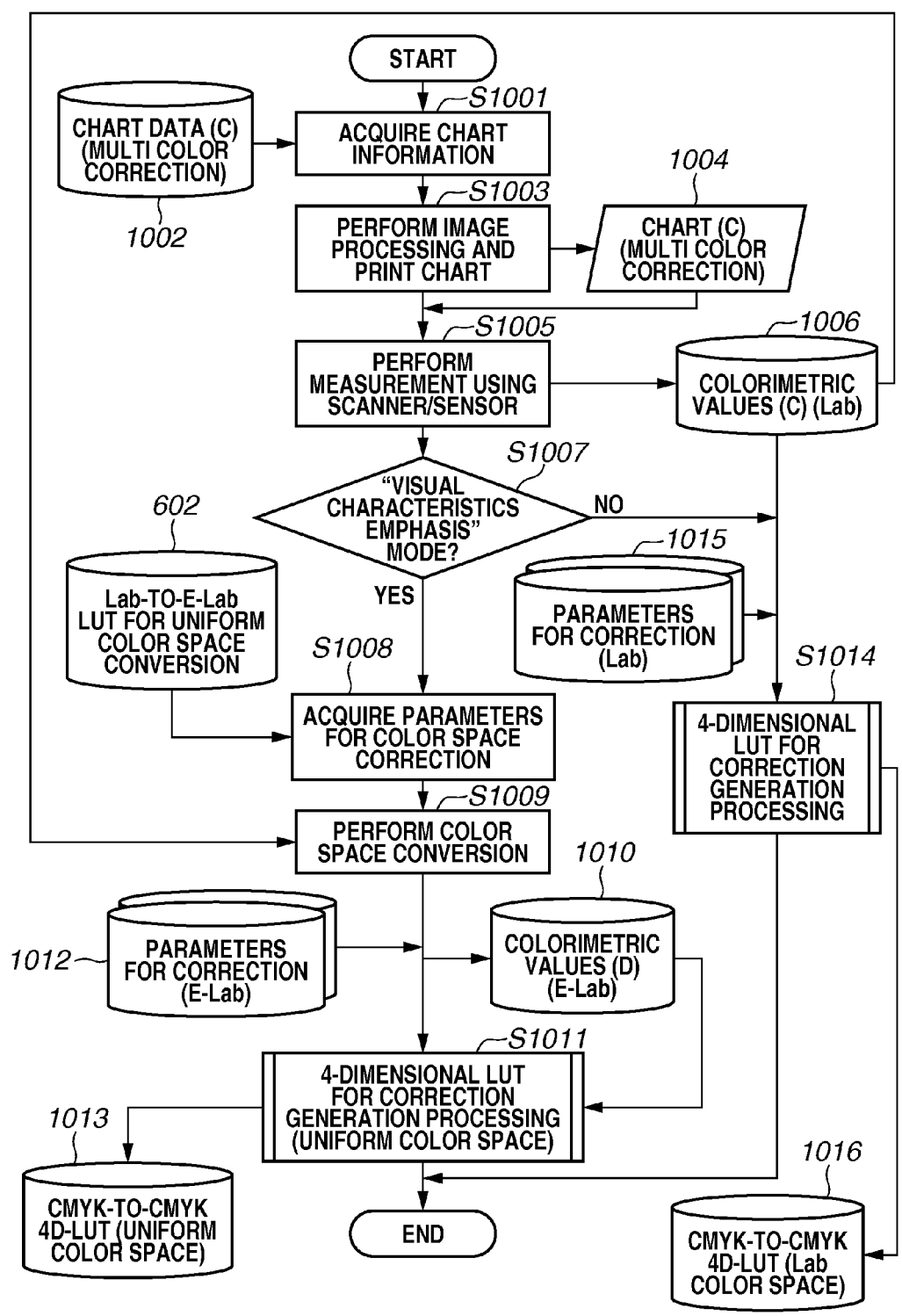
FIG. 10 is a flowchart illustrating multi color calibration processing according to the second exemplary embodiment.

FIG. 10 illustrates a processing flow according to the present exemplary embodiment. The following processing flow is implemented by the CPU 103 in the controller 102 executing the processing. The acquired data is stored in the storage device 121. The display unit 118 displays an instruction to the user on a UI, and receives a user instruction from the input unit 120.

The processing flow for acquiring colorimetric values (C) 1006 in steps S1001 to S1005 is similar to the processing flow for acquiring the colorimetric values (C) 406 in steps S401 to S405 illustrated in FIG. 4, therefore, redundant description thereof will be omitted.

In step S1007, the CPU 103 determines whether the "VISUAL CHARACTERISTICS EMPHASIS" mode is selected. More specifically, when the "VISUAL CHARACTERISTICS EMPHASIS" button 903 is selected in the UI 901, the CPU 103 determines that the "VISUAL CHARACTERISTICS EMPHASIS" mode is selected. When the "COLOR DIFFERENCE (NUMERICAL VALUE) EMPHASIS" button 902 is selected, the CPU 103 determines that the "VISUAL CHARACTERISTICS EMPHASIS" mode is not selected.

When it is determined that the "VISUAL CHARACTERISTICS EMPHASIS" mode is selected (YES in step S1007), then in steps S1008 to S1011, the CPU 103 executes processing by using the LUT for uniform color space conversion 602 to calculate a CMYK-to-CMYK 4D-LUT (uniform color space) 1013.

The processing flow in steps S1008 to S1011 is similar to the processing flow in steps S807 to S810 illustrated in FIG. 8, therefore, description thereof will be omitted.

When the "VISUAL CHARACTERISTICS EMPHASIS" mode is determined to be not selected (NO in step S1007), then in step S1014, the CPU 103 generates a CMYK-to-CMYK 4D-LUT 1016 by using the colorimetric values (C) 1006 and parameters for correction (Lab) 1015. The parameters for correction (Lab) 1015 include the target values (C) 408, the CMY-to-Lab 3D-LUT 412, and the Lab-to-CMY 3D-LUT 409 generated in processing illustrated in FIG. 4. The processing in step S1014 is similar to the processing in steps S407 and S411 illustrated in FIG. 4, therefore, redundant description thereof will be omitted.

Although, in the present exemplary embodiment, the user selects whether multi color calibration is to be performed based on Lab values or E-Lab values by using buttons of a UI, a 4D-LUT for multi color correction may be generated for each of Lab values and E-Lab values without mode selection via the UI. In this case, the 4D-LUT for correction may be automatically selected depending on image data. For example, a 4D-LUT generated with Lab values is used when an RGB image is input, and a 4D-LUT generated with E-Lab values is used when a CMYK image is input.

According to the present exemplary embodiment, it becomes possible to perform correction adapted to the human visual characteristics without being affected by "distortion" peculiar to the "Lab color space" at the time of multi color calibration.

Further, according to the present exemplary embodiment, it becomes possible to select a color space to be corrected according to a user request by prompting the user to select a color space to be used for multi color calibration.

The following describes a third exemplary embodiment in which correction parameters are generated keeping a balance between the conventional Lab color space and the E-Lab color space (uniform color space) at the time of multi color calibration.

In the above-described exemplary embodiments, a color space to be used at the time of multi color calibration is selected by prompting the user to select "COLOR DIFFERENCE (NUMERICAL VALUE) EMPHASIS" or "VISUAL CHARACTERISTICS EMPHASIS" from a UI.

However, there is a case where a user wants to acquire a printout also in consideration of the visual characteristics while restricting the color differences (ΔE). For example, when outputting data including RGB and CMYK data, the visual characteristics become important for the RGB data portion, and the color differences (ΔE) become important for the CMYK data portion.

Therefore, taking the above-described situation into consideration, in the present exemplary embodiment, a case will be described below where multi color calibration processing is performed in consideration of both conventional Lab values and E-Lab values of the uniform color space.

Figure 11:
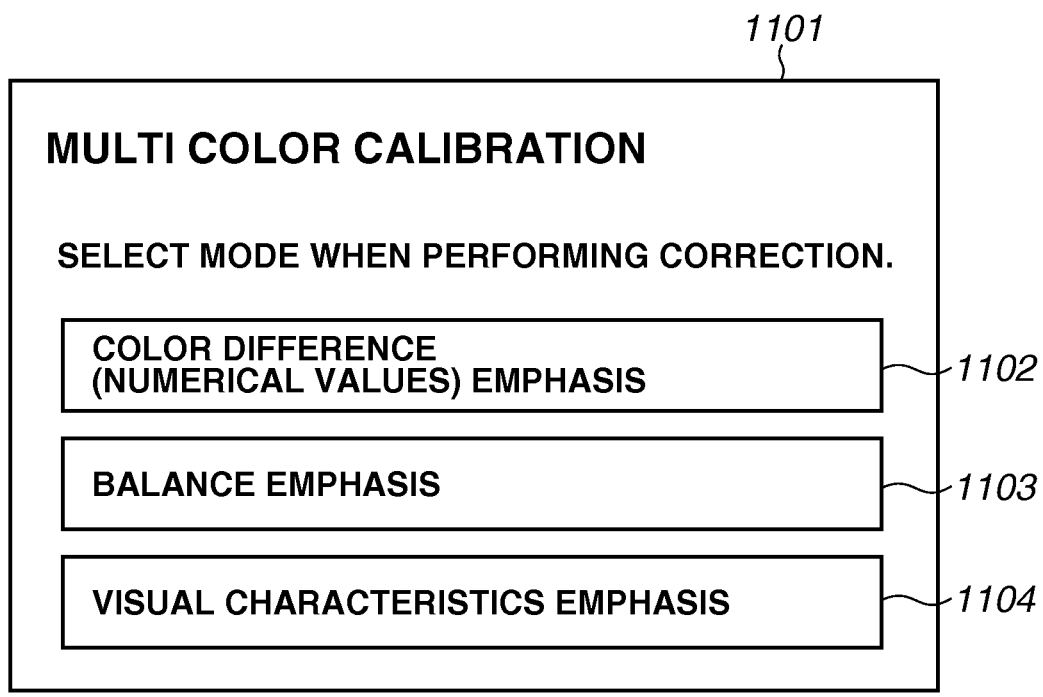
FIG. 11 illustrates an example of a UI for prompting the user to select a correction mode at the time of multi color calibration according to a third exemplary embodiment.

FIG. 11 illustrates an example of a UI according to the present exemplary embodiment. A UI 1101 is displayed on the display unit 118 before execution of multi color calibration. Since the frequency of selection depends on the usage status of the user, the UI 1101 does not need to be displayed each time multi color calibration is performed, but the UI 1101 may be displayed as an independent menu. The "COLOR DIFFERENCE (NUMERICAL VALUE) EMPHASIS" button 1102 and the "VISUAL CHARACTERISTICS EMPHASIS" button 1104 are similar to the "COLOR DIFFERENCE (NUMERICAL VALUE) EMPHASIS" button 902 and the "VISUAL CHARACTERISTICS EMPHASIS" button 903 illustrated in FIG. 9, respectively, therefore, redundant descriptions thereof will be omitted.

When the "BALANCE EMPHASIS" button 1103 is selected, the CPU 103 generates a 4D-LUT for multi color correction by using conventional Lab values and E-Lab values of the uniform color space.

Figure 12:
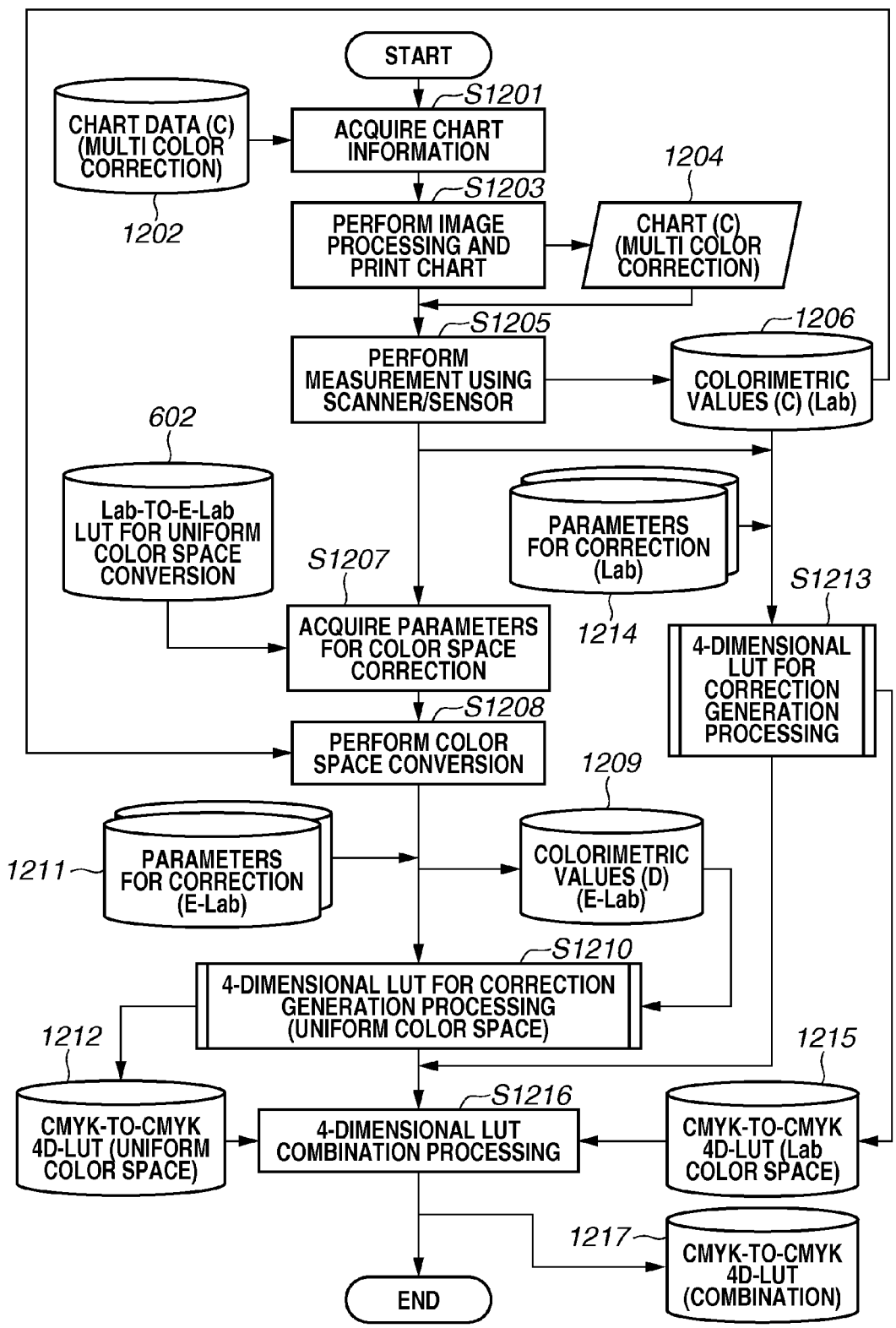
FIG. 12 is a flowchart illustrating multi color calibration processing according to the third exemplary embodiment.

FIG. 12 illustrates a processing flow according to the present exemplary embodiment. The following processing flow is implemented by the CPU 103 in the controller 102 executing the processing. The acquired data is stored in the storage device 121. The display unit 118 displays an instruction to the user on a UI, and receives a user instruction from the input unit 120.

The processing flow illustrated in FIG. 12 indicates a processing flow when the "BALANCE EMPHASIS" button 1103 is selected in the UI 1101. The processing flow when the "COLOR DIFFERENCE (NUMERICAL VALUE) EMPHASIS" button 1102 and the "VISUAL CHARACTERISTICS EMPHASIS" button 1104 are selected is similar to the processing flow illustrated in FIG. 10, therefore, redundant description thereof will be omitted.

The processing flow for acquiring colorimetric values (C) 1206 in steps S1201 to S1205 is similar to the processing flow for acquiring the colorimetric values (C) 406 in steps S401 to S405 illustrated in FIG. 4, therefore, redundant description thereof will be omitted.

The processing flow for acquiring a CMYK-to-CMYK 4D-LUT (uniform color space) 1212 in steps S1207 to S1210 is similar to the processing flow in steps S1008 to S1011 illustrated in FIG. 10, therefore, description thereof will be omitted.

The processing flow for acquiring a CMYK-to-CMYK 4D-LUT (Lab color space) 1215 in step S1213 is similar to the processing flow in step S1014 illustrated in FIG. 10, therefore, description thereof will be omitted.

In step S1216, the CPU 103 combines CMYK values of the CMYK-to-CMYK 4D-LUT (uniform color space) 1212 with CMYK values of the CMYK-to-CMYK 4D-LUT (Lab color space) 1215 to generate a CMYK-to-CMYK 4D-LUT (combination) 1217.

A method of combination will be described below with reference to FIG. 15. Table 1501 illustrates the CMYK-to- CMYK 4D-LUT (uniform color space) 1212 describing CMYK output values corresponding to certain CMYK input values for each color. Referring to Table 1501, although all of output values are XXX, different output values are actually described according to input values in most cases. Similarly, Table 1502 illustrates the CMYK-to-CMYK 4D-LUT (Lab color space) 1215 describing output values YYY. Similarly, Table 1503 illustrates the CMYK-to-CMYK 4D-LUT (combination) 1217 describing output values ZZZ.

The output values ZZZ are determined for each of the C, M, Y, and K colors by using the following formula (2).

$$ZZZ = \frac{(XXX + YYY)}{2} \quad \text{Formula (2)}$$

The formula (2) uses averages of the output values of the CMYK-to-CMYK 4D-LUT (uniform color space) 1212 and the CMYK-to-CMYK 4D-LUT (Lab color space) 1215 as CMYK values of the CMYK-to-CMYK 4D-LUT (combination) 1217.

More specifically, CMYK values are acquired by combining correction coefficients used when generating respective CMYK-to-CMYK 4D-LUTs.

Although, in the present exemplary embodiment, processing when "BALANCE EMPHASIS" is selected on the UI is performed, the CMYK-to-CMYK 4D-LUT (combination) 1217 may be generated without making a selection via the UI.

According to the present exemplary embodiment, it becomes possible to perform correction adapted to the human visual characteristics without being affected by "distortion" peculiar to the "Lab color space" at the time of multi color calibration.

Further, according to the present exemplary embodiment, it becomes possible to change the color space to be corrected according to a user request by prompting the user to select a color space to be used at the time of multi color calibration.

Further, according to the present exemplary embodiment, it becomes possible to perform correction in consideration of the balance between the Lab color space and the uniform color space by generating a new 4D-LUT based on 4D-LUTs generated in the conventional Lab color space and the uniform color space at the time of multi color calibration.

The following describes a fourth exemplary embodiment in which the level of the balance is changed according to a user request when generating correction parameters keeping a balance between the conventional Lab color space and the E-Lab color space (uniform color space) at the time of multi color calibration.

In the above-described exemplary embodiments, correction parameters are generated keeping a balance between the conventional Lab color space and the E-Lab color space (uniform color space).

However, there is a case where, depending on a user request, correction parameters attaching importance to the visual characteristics or correction parameters attaching importance to the color differences (ΔE) are required. For example, when RGB images are more often output than CMYK images, parameters attaching importance to the visual characteristics which is likely to affect an RGB image are required.

Therefore, taking the above-described situation into consideration, an exemplary embodiment will be described below in a case where multi color calibration processing is performed keeping a balance between conventional Lab values and E-Lab values of the uniform color space.

Figure 13:
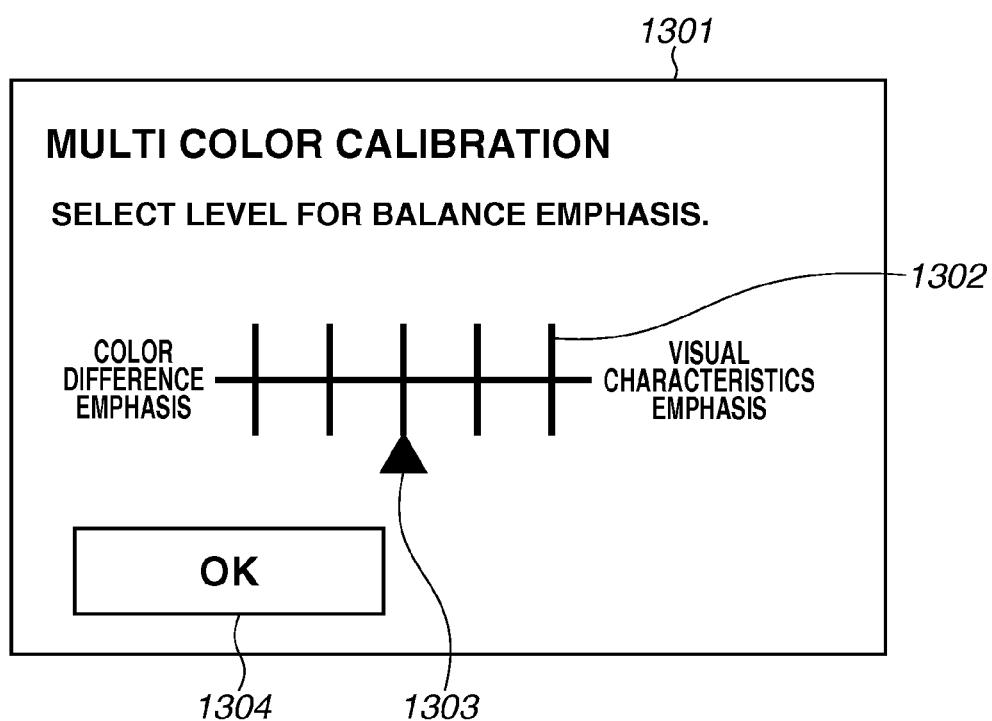
FIG. 13 illustrates an example of a UI for prompting a user to select a correction mode at the time of multi color calibration according to a fourth exemplary embodiment.

FIG. 13 illustrates an example of a UI according to the present exemplary embodiment. A UI 1301 is displayed on the display unit 118 before execution of multi color calibration. Since the frequency of selection depends on the usage status of the user, the UI 1301 does not need to be displayed each time multi color calibration is performed. Therefore, the UI 1301 may be displayed as an independent menu. The UI 1301 is a menu related to the "BALANCE EMPHASIS" button 1103 of the UI 1101 illustrated in FIG. 11. A UI for selection 1302 is used to select a level of importance attached to color difference emphasis and visual characteristics emphasis when "BALANCE EMPHASIS" is selected. When a selection button 1303 is moved toward the side of "VISUAL CHARACTERISTICS EMPHASIS," importance is attached to the result of correction using E-Lab values of the uniform color space in a case where calibration processing is performed placing emphasis on balance. On the other hand, when the selection button 1303 is moved toward the side of "COLOR DIFFERENCE EMPHASIS," importance is attached to the result of correction with conventional Lab values in a case where calibration processing is performed placing emphasis on balance. When the importance level is set and an OK button 1304 is selected, the processing to be performed at the time of calibration placing emphasis on balance is determined.

Figure 14:
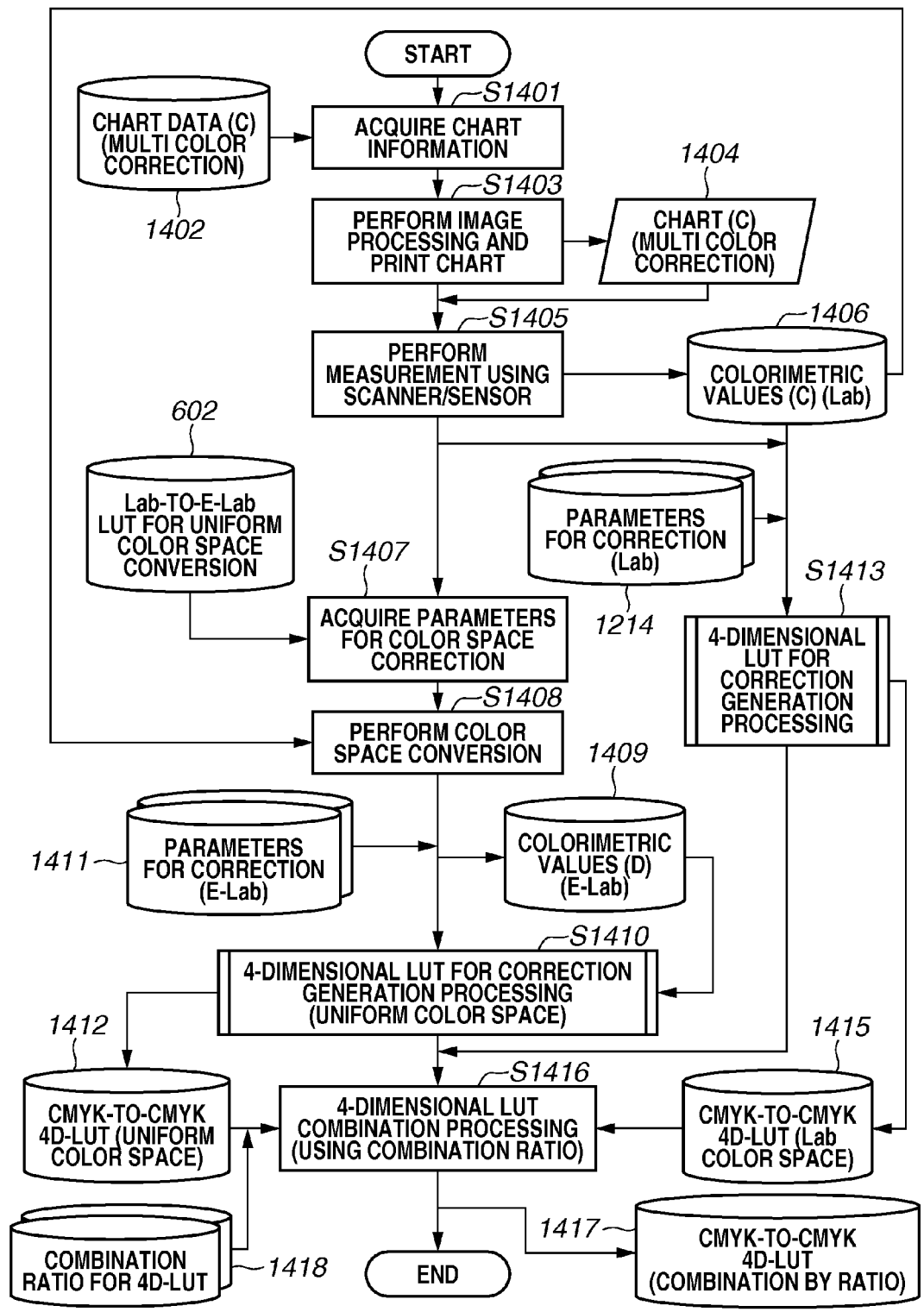
FIG. 14 is a flowchart illustrating multi color calibration processing according to the fourth exemplary embodiment.

FIG. 14 illustrates a processing flow according to the present exemplary embodiment. The following processing flow is implemented by the CPU 103 in the controller 102 executing the processing. The acquired data is stored in the storage device 121. The display unit 118 displays an instruction to the user on a UI, and receives a user instruction from the input unit 120.

The processing flow illustrated in FIG. 12 indicates a processing flow when the "BALANCE EMPHASIS" button 1103 is selected in the UI 1101.

Since the processing flow in steps S1401 to S1413 is similar to the processing flow in steps S1201 to S1213 illustrated in FIG. 12, description thereof will be omitted.

In step S1416, the CPU 103 combines CMYK values of a 4D-LUT (uniform color space) 1412 with CMYK values of a 4D-LUT (Lab color space) 1415 by using a 4D-LUT combination ratio 1418 to generate a CMYK-to-CMYK 4D-LUT (combination by ratio) 1417.

Similar to the third exemplary embodiment, a specific method of combination will be described below with reference to FIG. 15. Table 1501 indicates the CMYK-to-CMYK 4D-LUT (uniform color space) 1412, describing CMYK output values corresponding to certain CMYK input values for each color. Referring to Table 1501, although all of output values are XXX, different output values are actually described according to input values, in most cases. Similarly, Table 1502 indicates the CMYK-to-CMYK 4D-LUT (Lab color space) 1415 describing output values YYY. Similarly, Table 1503 indicates the CMYK-to-CMYK 4D-LUT (combination by ratio) 1417 describing output values ZZZ.

The output values ZZZ are determined for each of the C, M, Y, and K colors by using the following formula (3).

$$ZZZ = \frac{(\alpha \times XXX) + (\beta \times YYY)}{(\alpha + \beta)} \quad \text{Formula (3)}$$

(α: Weighting coefficient for visual characteristics emphasis, β: Weighting coefficient for color difference emphasis)

The formula (3) uses weighted averages of the output values of the CMYK-to-CMYK 4D-LUT (uniform color space) 1412 and the CMYK-to-CMYK 4D-LUT (Lab color space) 1415 as CMYK values of the CMYK-to-CMYK 4D-LUT (combination by ratio) 1417. The values of weighting coefficients α and β change with the importance level selected in the UI 1301. When the selection button 1303 is moved toward the side of "VISUAL CHARACTERISTICS EMPHASIS," the weighting coefficient α increases. On the other hand, when the selection button 1303 is moved toward the side of "COLOR DIFFERENCE EMPHASIS," the weighting coefficient β increases.

Although, in the present exemplary embodiment, the weighting coefficients α and β are determined by prompting the user to select the importance level, the processing is not limited thereto. For example, it is also possible to generate correction parameters which prioritize either "VISUAL CHARACTERISTICS EMPHASIS" or "COLOR DIFFERENCE EMPHASIS" by differentiating weight between α and β in the default state.

According to the present exemplary embodiment, it becomes possible to perform correction adapted to the human visual characteristics without being affected by "distortion" peculiar to the "Lab color space" at the time of multi color calibration.

Further, according to the present exemplary embodiment, it becomes possible to change the color space to be corrected according to a user request by prompting the user to select a color space to be used at the time of multi color calibration.

Further, according to the present exemplary embodiment, it becomes possible to perform correction according to a user request by generating a new 4D-LUT based on a determined weight for prioritizing either the conventional Lab color space or the uniform color space at the time of multi color calibration.

Other Embodiments

The present exemplary embodiment is achieved also by performing the following processing. Specifically, software (program) implementing the functions of the above-described exemplary embodiments is supplied to the system or apparatus via a network or various storage media, and a computer (or CPU or micro processing unit (MPU)) of the system or apparatus reads and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261493 filed Dec. 18, 2013, which is hereby incorporated by reference herein in its entirety.

What is claimed is:

1. An image processing apparatus comprising a memory and at least one processor that executes a program to function as:
   a first color conversion table for converting a device-independent color space into a uniform color space, the uniform color space being a color space in which a Lab color space is corrected to improve a correlativity with human visual characteristics;
   an output unit configured to output a chart to a printer by using a plurality of types of multi color chart data represented in a three-dimensional color space formed of cyan, magenta, and yellow;
   a colorimetric value acquisition unit configured to acquire colorimetric values resulting from colorimetry performed on the output chart in the device-independent color space;
   a color conversion table acquisition unit configured to acquire a second color conversion table for converting a three-dimensional color space into the uniform color space;
   a conversion unit configured to convert the acquired colorimetric values of the device-independent color space into colors of the uniform color space by using the first color conversion table which is converting the device-independent color space into the uniform color space;
   a target value acquisition unit configured to acquire predetermined target values of the uniform color space;
   a correction unit configured to correct a third color conversion table for converting the uniform color space into the three-dimensional color space by using differences between the acquired colorimetric values of the uniform color space and the acquired target values of the uniform color space;
   a generation unit configured to generate a fourth color conversion table for correcting a four-dimensional color space formed of cyan, magenta, yellow, and black by using weighted averages of the second color conversion table and the corrected third color conversion table; and
   a receiving unit configured to receive an instruction on whether to generate the fourth color conversion table for correcting the four-dimensional color space generated by the generation unit by using colors of the uniform color space or by using colors of the device-independent color space,
   wherein, when the receiving unit receives an instruction to generate the fourth color conversion table for correcting the four-dimensional color space by using colors of the uniform color space, the generation unit generates the fourth color conversion table for correcting the four-dimensional color space by using the colorimetric values converted into colors of the uniform color space, the second color conversion table, and the corrected third color conversion table, and
   wherein, when the receiving unit receives an instruction to generate a fourth color conversion table for correcting the four-dimensional color space by using colors of the device-independent color space, the generation unit generates the fourth color conversion table for correcting the four-dimensional color space by using the colorimetric values of the device-independent color space, a fifth color conversion table for converting the three-dimensional color space into the device-independent color space, and a sixth color conversion table for converting a device-independent color space into the three-dimensional color space.

2. The image processing apparatus according to claim 1, wherein the second color conversion table is acquired by converting values of a device-independent color space in the fifth color conversion table for converting the three-dimensional color space into the device-independent color space, into values of the uniform color space.

3. The image processing apparatus according to claim 1, wherein the third color conversion table is acquired by converting values of the device-independent color space in the sixth color conversion table for converting the device-independent color space into the three-dimensional color space, into values of the uniform color space.

4. The image processing apparatus according to claim 1, wherein the generation unit generates a composite color conversion table for correcting the four-dimensional color space by using a value acquired by combining a first correction coefficient with a second correction coefficient,
wherein the first correction coefficient is acquired by using the colorimetric values converted into colors of the uniform color space, the second color conversion table, and the corrected third color conversion table, and
wherein the second correction coefficient is acquired by using the colorimetric values of the device-independent color space, the fifth color conversion table for converting the three-dimensional color space into the device-independent color space, and the sixth color conversion table for converting the device-independent color space into the three-dimensional color space.

5. The image processing apparatus according to claim 4, wherein, when the generation unit generates the composite color conversion table for correcting the four-dimensional color space by using the value acquired by combining the first correction coefficient with the second correction coefficient, a method for combining the first correction coefficient with the second correction coefficient is determined according to a specified weight.

6. An image processing method that uses a conversion table configured to convert a device-independent color space into a uniform color space, the uniform color space being a color space in which a Lab color space is corrected to improve a correlativity with human visual characteristics, the method comprising:
outputting a chart to a printer by using a plurality of types of multi color chart data represented in a three-dimensional color space formed of cyan, magenta, and yellow;
acquiring colorimetric values resulting from colorimetry performed on the output chart in the device-independent color space;
acquiring a second color conversion table for converting the three-dimensional color space into the uniform color space;
converting the acquired colorimetric values of the device-independent space into colors of the uniform color space by using the first color conversion table which is converting the device-independent color space into the uniform color space;
acquiring predetermined target values of the uniform color space;
correcting a third color conversion table for converting the uniform color space into the three-dimensional color space by using differences between the acquired colorimetric values of the uniform color space and the acquired target values of the uniform color space;
generating a fourth color conversion table for correcting the four-dimensional color space formed of cyan, magenta, yellow, and black by using weighted averages of the second color conversion table and the corrected third color conversion table; and
receiving an instruction on whether to generate the fourth color conversion table for correcting the generated four-dimensional color space by using colors of the uniform color space or by using colors of the device-independent color space,
wherein, when the receiving receives an instruction to generate the fourth color conversion table for correcting the four-dimensional color space by using colors of the uniform color space, the generating generates the fourth color conversion table for correcting the four-dimensional color space by using the colorimetric values converted into colors of the uniform color space, the second color conversion table, and the corrected third color conversion table, and
wherein, when the receiving receives an instruction to generate a fourth color conversion table for correcting the four-dimensional color space by using colors of the device-independent color space, the generating generates the fourth color conversion table for correcting the four-dimensional color space by using the colorimetric values of the device-independent color space, a fifth color conversion table for converting the three-dimensional color space into the device-independent color space, and a sixth color conversion table for converting a device-independent color space into the three-dimensional color space.

7. The image processing method according to claim 6, wherein the second color conversion table is acquired by converting values of the device-independent color space in the fifth color conversion table for converting the three-dimensional color space into the device-independent color space, into values of the uniform color space.

8. The image processing method according to claim 6, wherein the third color conversion table is acquired by converting values of the device-independent color space in the sixth color conversion table for converting the device-independent color space into the three-dimensional color space, into values of the uniform color space.

9. The image processing method according to claim 6, wherein a composite color conversion table for correcting the four-dimensional color space is generated by using a value acquired by combining a first correction coefficient with a second correction coefficient,
wherein the first correction coefficient is acquired by using the colorimetric values converted into colors of the uniform color space, the second color conversion table, and the corrected third color conversion table, and
wherein the second correction coefficient is acquired by using the colorimetric values of the device-independent color space, the fifth color conversion table for converting the three-dimensional color space into the device-independent color space, and the sixth color conversion table for converting a device-independent color space into the three-dimensional color space.

10. The image processing method according to claim 9, wherein, when the composite color conversion table for correcting the four-dimensional color space is generated by using the value acquired by combining the first correction coefficient with the second correction coefficient, a method for combining the first correction coefficient with the second correction coefficient is determined according to a specified weight.

11. A non-transitory computer-readable storage medium storing program for causing a computer to execute an image processing method that uses a conversion table configured to convert a device-independent color space into a uniform color space, the uniform color space being a color space in which a Lab color space is corrected to improve a correlativity with human visual characteristics, the method comprising:

outputting a chart to a printer by using a plurality of types of multi color chart data represented in a three-dimensional color space formed of cyan, magenta, and yellow;

acquiring colorimetric values resulting from colorimetry performed on the output chart in the device-independent color space;

acquiring a second color conversion table for converting the three-dimensional color space into the uniform color space;

converting the acquired colorimetric values of the device-independent space into colors of the uniform color space by using the first color conversion table which is converting the device-independent color space into the uniform color space;

acquiring predetermined target values of the uniform color space;

correcting a third color conversion table for converting the uniform color space into the three-dimensional color space by using differences between the acquired colorimetric values of the uniform color space and the acquired target values of the uniform color space;

generating a fourth color conversion table for correcting the four-dimensional color space formed of cyan, magenta, yellow, and black by using weighted averages of the second color conversion table and the corrected third color conversion table; and receiving an instruction on whether to generate the fourth color conversion table for correcting the generated four-dimensional color space by using colors of the uniform color space or by using colors of the device-independent color space, wherein, when the receiving receives an instruction to generate the fourth color conversion table for correcting the four-dimensional color space by using colors of the uniform color space, the generating generates the fourth color conversion table for correcting the four-dimensional color space by using the colorimetric values converted into colors of the uniform color space, the second color conversion table, and the corrected third color conversion table, and wherein, when the receiving receives an instruction to generate a fourth color conversion table for correcting the four-dimensional color space by using colors of the device-independent color space, the generating generates the fourth color conversion table for correcting the four-dimensional color space by using the colorimetric values of the device-independent color space, a fifth color conversion table for converting the three-dimensional color space into the device-independent color space, and a sixth color conversion table for converting a device-independent color space into the three-dimensional color space.

* * * * *